(12) United States Patent
Roth

(10) Patent No.: US 8,101,678 B2
(45) Date of Patent: Jan. 24, 2012

(54) DOPO FLAME RETARDANT COMPOSITIONS

(75) Inventor: Michael Roth, Lautertal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/593,018

(22) PCT Filed: Mar. 25, 2008

(86) PCT No.: PCT/EP2008/053474
§ 371 (c)(1),
(2), (4) Date: Jan. 22, 2010

(87) PCT Pub. No.: WO2008/119693
PCT Pub. Date: Oct. 9, 2008

(65) Prior Publication Data
US 2010/0234495 A1  Sep. 16, 2010

(30) Foreign Application Priority Data

Apr. 3, 2007 (EP) .................................... 07105543

(51) Int. Cl.
*C08K 5/527* (2006.01)
(52) U.S. Cl. ......... 524/117; 524/119; 524/126; 524/133
(58) Field of Classification Search ................ 524/117, 524/119, 126, 133
See application file for complete search history.

(56) References Cited

U.S. PATENT DOCUMENTS

| 6,984,717 B2 * | 1/2006 | Van Den Bergen ........... 528/400 |
| 7,132,502 B2 * | 11/2006 | Depuydt et al. .............. 528/480 |
| 2005/0239975 A1 | 10/2005 | Gan |
| 2006/0074154 A1 | 4/2006 | Harashina |
| 2008/0090950 A1 | 4/2008 | Costanzi et al. |
| 2010/0307803 A1 * | 12/2010 | Paul et al. ..................... 174/257 |

FOREIGN PATENT DOCUMENTS

| EP | 1 544 227 A | 6/2005 |
| JP | 2003-165899 A | 6/2003 |
| WO | 2005/121232 A | 12/2005 |
| WO | 2006/035868 A1 | 4/2006 |

OTHER PUBLICATIONS

English language abstract of EP 1 544 227 from the esp@cenet web site printed on Nov. 20, 2009.
English language abstract num 2004-102472 of JP 2003-165899.
English language abstract of WO 2006/035868 from the esp@cenet web site printed on Nov. 20, 2009.

* cited by examiner

*Primary Examiner* — Peter Szekely
(74) *Attorney, Agent, or Firm* — Tyler A. Stevenson

(57) ABSTRACT

The present invention relates to flame retardant polymer compositions which comprise mixtures of phosphinic acid salts and dihydro-oxa-phospho-phenantrene derivatives. The compositions are especially useful for the manufacture of flame retardant compounds based on polycondensates like polyesters, polyamides and polycarbonates.

4 Claims, No Drawings

DOPO FLAME RETARDANT COMPOSITIONS

The present invention relates to flame retardant polymer compositions which comprise mixtures of phosphinic acid salts and dihydro-oxa-phospho-phenantrene derivatives. The compositions are especially useful for the manufacture of flame retardant compounds based on polycondensates like polyesters, polyamides and polycarbonates.

Flame retardants are added to polymeric materials (synthetic or natural) to enhance the flame retardant properties of the polymers. Depending on their composition, flame retardants may act in the solid, liquid or gas phase either chemically, e.g. as a spumescent by liberation of nitrogen, and/or physically, e.g. by producing a foam coverage. Flame retardants interfere during a particular stage of the combustion process, e.g. during heating, decomposition, ignition or flame spread.

There is still a need for flame retardant compositions with improved properties that can be used in different polymer substrates. Increased standards with regard to safety and environmental requirements result in stricter regulations. Particularly known halogen containing flame retardants no longer match all necessary requirements. Therefore, halogen free flame retardants are preferred, particularly in view of their better performance in terms of smoke density associated with fire. Improved thermal stability and less corrosive behaviour are further benefits of halogen free flame retardant compositions.

It has surprisingly been found that polymers with excellent flame retardant properties are prepared in the event that combinations of phosphinic acid metal salts with dihydro-oxaphosphophenantrene derivatives are added to the polymer substrate. Moreover, flaming dripping during the application of fire is significantly reduced.

Further benefits of the present invention are improved electrical properties (CTI=comparative tracking index) which cannot be achieved by using halogenated FR systems and less interactions with the polymer matrix during processing (reduced molecular weight decrease). Additionally, the flame retardants are resistant to hydrolysis (leaching test: water, 70° C., 168 h), so contact with water may not diminish their flame retardant activity.

It has surprisingly been found that by use of the instant flame retardant compositions according to the invention halogen containing flame retardants, antimony compounds and fillers may be largely reduced or replaced.

The invention relates to a composition which comprises
a) At least one salt of phosphinic acid of the formula (I)

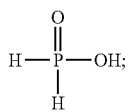

b) At least one derivative of oxaphosphorinoxide as represented by the formula (II)

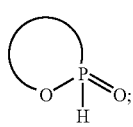

and
c) A polymer substrate.

The compositions according to the invention attain the desirable V-0 rating, according to UL-94 (Underwriter's Laboratories Subject 94) and other excellent ratings in related test methods, especially in glass fiber reinforced formulations where conventional FR systems tend to fail.

The composition, as defined above, comprises the following components:

Component a)

The term salt of phosphinic acid comprises within its scope preferably a metal salt, for example an alkali metal or alkaline earth metal salt, e.g. the sodium, potassium, magnesium or calcium salt or the zinc or boron salt.

According to a preferred embodiment, the composition comprises the aluminium salt of phosphinic acid.

According to an alternative embodiment, the term salts comprises non-metallic salts, e.g. the ammonium, ($C_1$-$C_{22}$alkyl)$_{1-4}$ammonium or (2-hydroxyethyl)$_{1-4}$ammonium, e.g. tetramethylammonium, tetraethylammonium or the 2-hydroxyethyltrimethylammonium salt.

Component b)

Oxaphosphorinoxide has a cyclic structure and is represented by the following general formula:

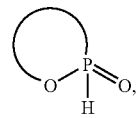

(II)

In the oxaphosphorinoxide (II) the phosphorous atom and one oxygen atom are part of a cyclic structure, particularly a five or six membered ring, and at least one group of the partial formula

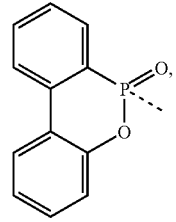

(A)

is present.

According to a preferred embodiment, the oxaphosphorinoxide (II) is represented by the following structural formula: (IIa)

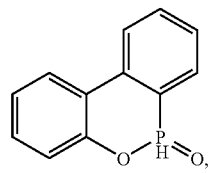

which can be named as 6H-dibenz[c,e][1,2]oxaphosphorin-6-oxide, 3,4:5,6-dibenzo-2H-1,2-oxaphosphorin-2-oxide or 9,10-dihydro-9-oxa-10-phosphorylphenanthrene-10-oxide, abbreviated as DOPO (C.A. RN 35948-25-5). Such compound is commercially available from Sanko Co, Ltd. under the trade name Sanko-HCA.

Two different structural formulae may be assigned to DOPO and its hydrolysis product:

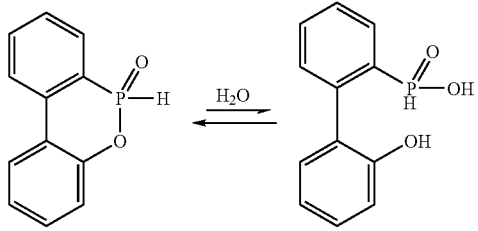

Suitable derivatives of oxaphosphorinoxide are 9,10-dihydro-9-oxa-10-phosphorylphenanthrene-10-oxide (DOPO), salts of DOPO, such as the zinc salts

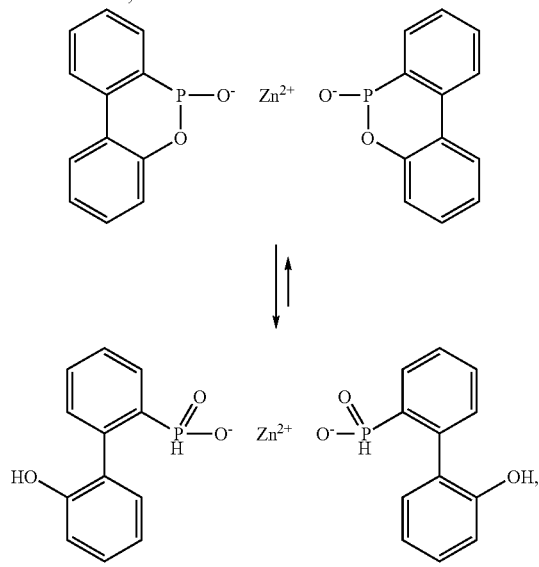

or
R-substituted oxaphosphorinoxides of the formula (IIb)

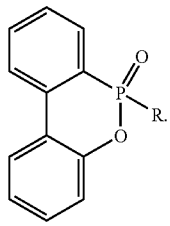

Wherein the phenyl groups may be substituted by additional substituents and R represents $C_1$-$C_{18}$alkyl or $C_6$-$C_{12}$ aryl, which may be substituted by further substituents.

Representative compounds (IIb) are compounds of the formula:

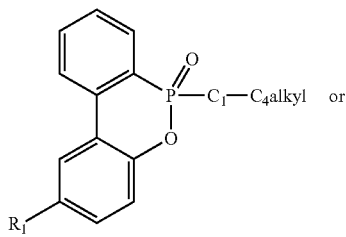

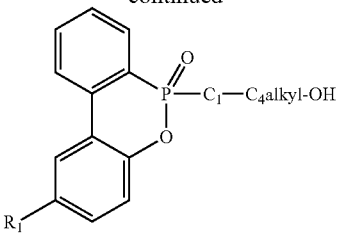

Wherein $R_1$ represents hydrogen or $C_1$-$C_4$alkyl;

Other representative compounds (IIb) are compounds, wherein R represents carboxyalkyl, carboxyalkyl which is esterified by hydroxyalkyl, or represents carboxyimidoalkyl, such as the compounds of the formulae:

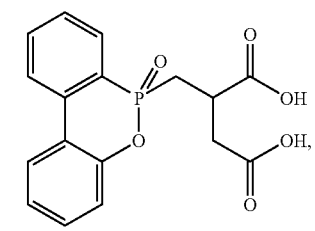

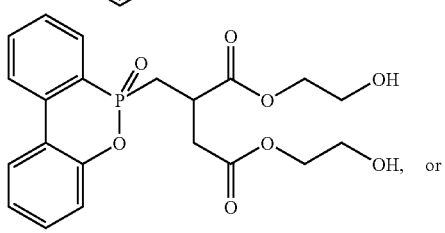

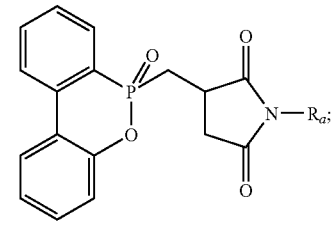

Wherein $R_a$ represents hydrogen or $C_1$-$C_4$alkyl; or represents alkoxyalkyl, such as the compounds of the formula:

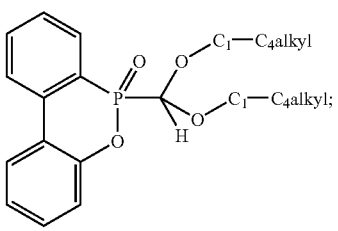

Aryl, such as the compounds of the formulae:

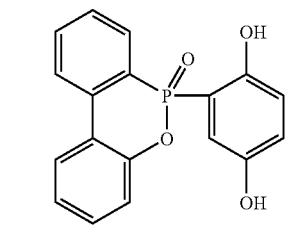

-continued

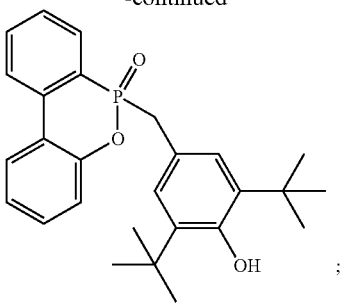

Or wherein R represents arylalkyl, such the compounds of the formulae

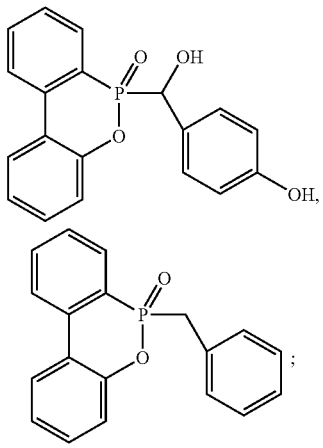

Or wherein R represents alkoxyalkyl substituted by hydroxy, such as the compound of the formula

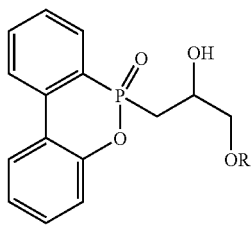

as obtained by reaction of DOPO with epoxides:

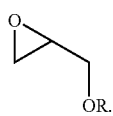

According to an alternative embodiment, suitable derivatives of oxaphosphorinoxide are characterized by the presence of two groups of the partial formula (A)

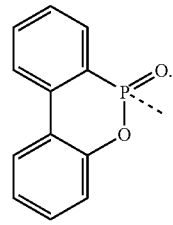

These groups are connected with a bivalent bridge group X, such as compounds of the formula (IIc)

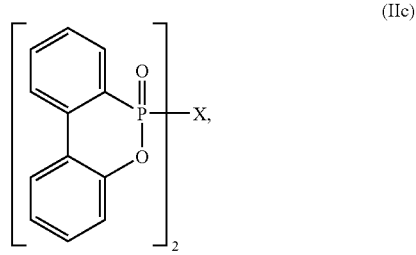

Wherein the phenyl groups may be substituted by further substituents.

Representative examples of these compounds are compounds of the formulae:

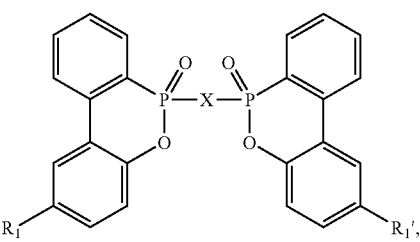

Wherein X represents $C_2$-$C_6$alkylene and $R_1$ and $R_1'$ represent hydrogen or $C_1$-$C_4$alkyl;

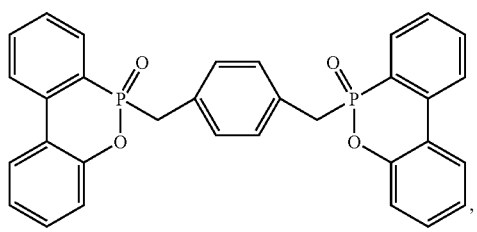

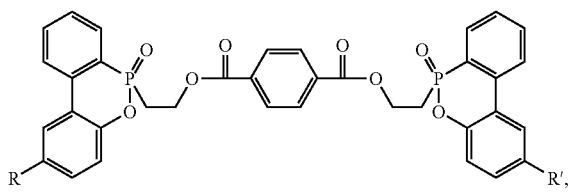

Wherein R and R' represent hydrogen or $C_1$-$C_4$alkyl;

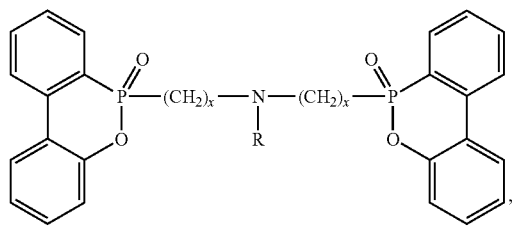

Wherein x represents a numeral from 2 to 4 and R represents $C_1$-$C_4$alkyl or $C_6$-$C_{10}$ aryl or tosyl;

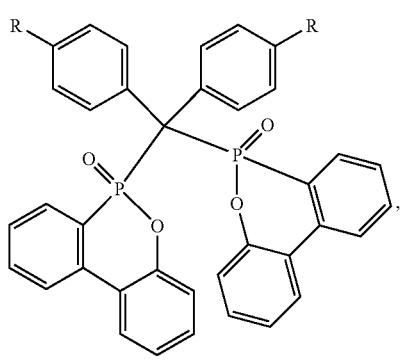

Wherein R represents hydroxy or amino;

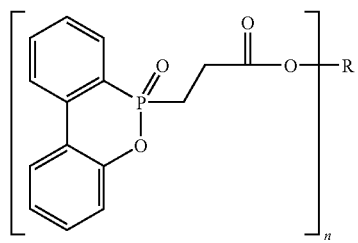

Wherein n represents a numeral from two to six and R represents the ester group from a polyhydroxy alcohol, such as di-, tri- or tetrahydroxy alcohol, e.g. ethylene glycol, trimethylol propane, pentaerythritol or dipentaerythritol, as obtained by reaction of DOPO with acrylic acid-R-esters and subsequent transesterification:

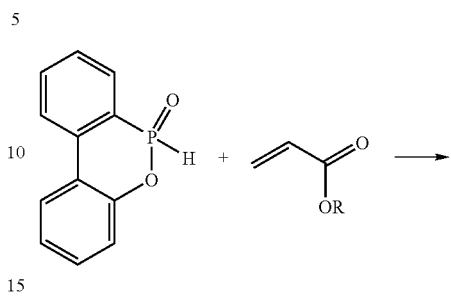

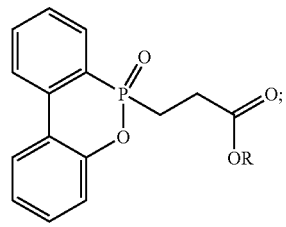

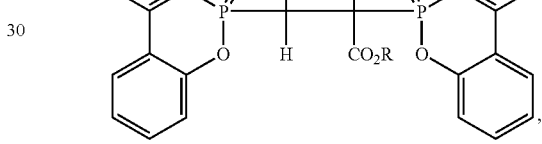

Wherein R represents $C_1$-$C_4$alkyl, as obtained by reaction of:

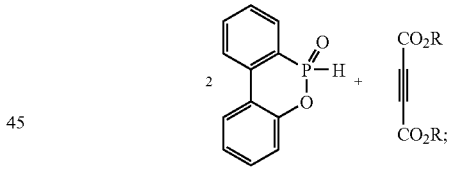

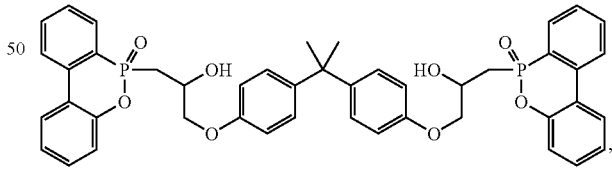

as obtained by the reaction of DOPO with or the corresponding diacyl derivative thereof of the formula

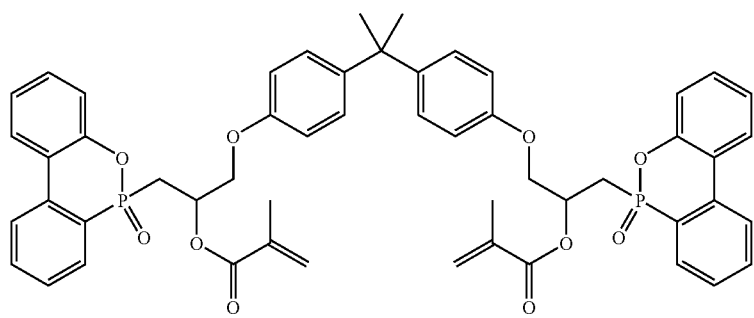

(Acyl: (meth)acryloyl);
Or the compounds of the formulae

According to an alternative embodiment, suitable derivatives of oxaphosphorinoxide are characterized by the presence of three groups of the partial formula (A). These groups are connected with a trivalent group Y, such as compounds of the formula $$[\text{oxaphosphorinoxide-}]_3\text{Y} \quad (IId)$$

Wherein the phenyl groups may be substituted by further substituents.

Representative examples of these compounds are compounds of the formulae:

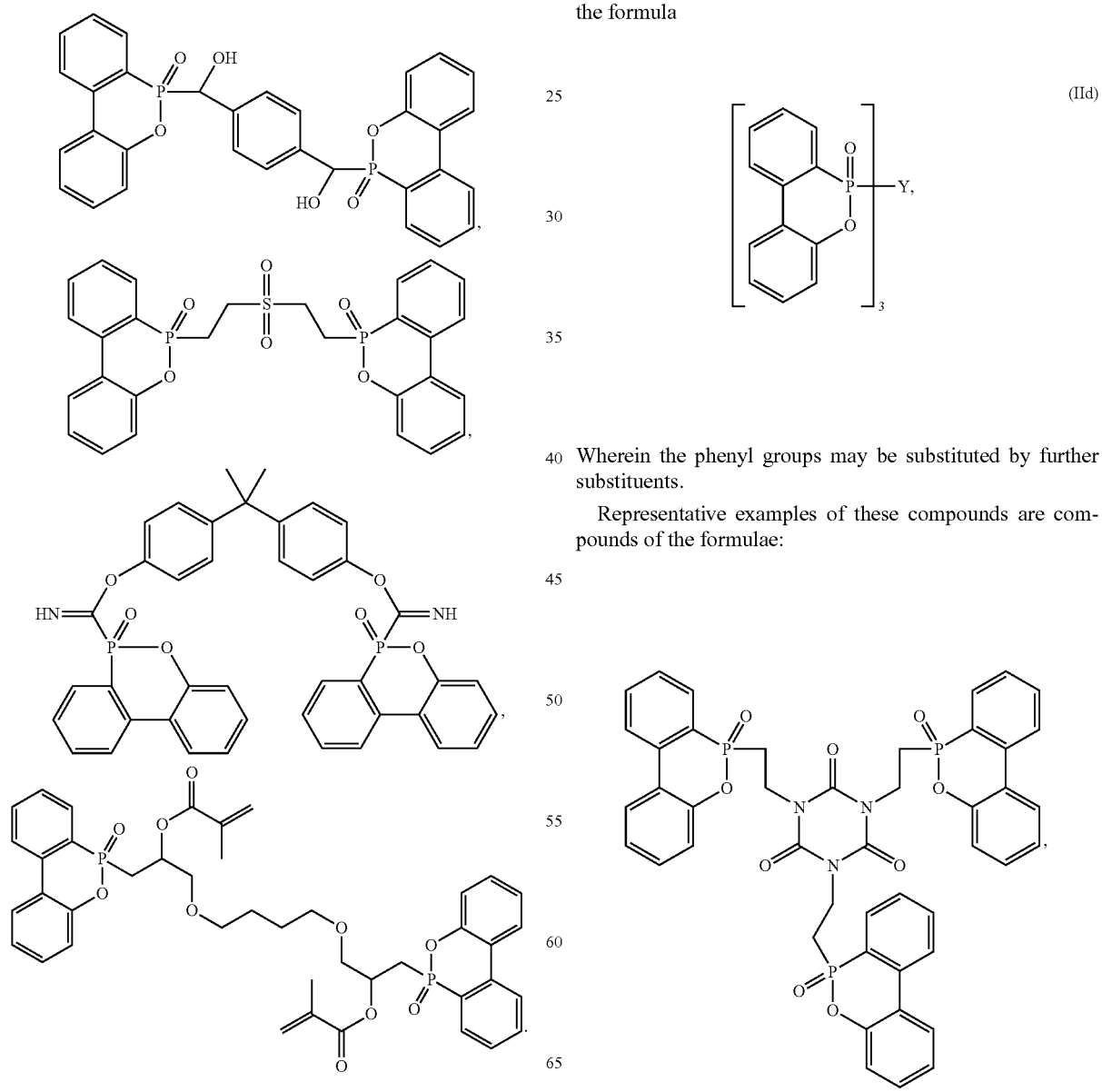

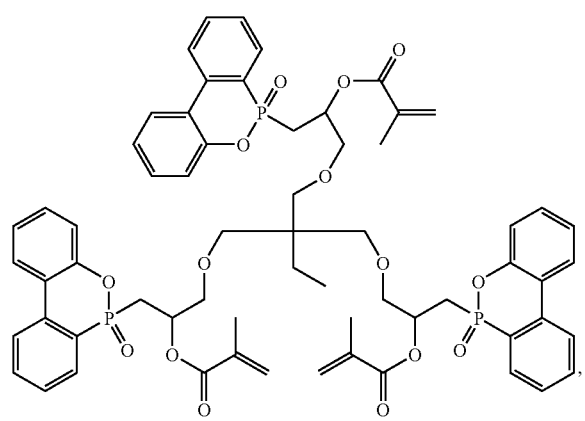

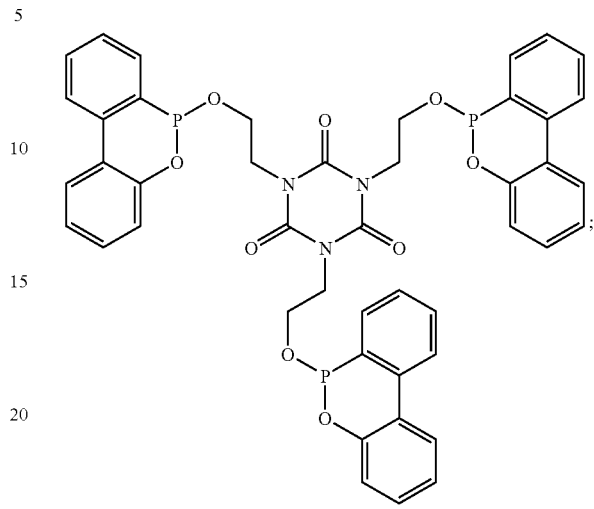

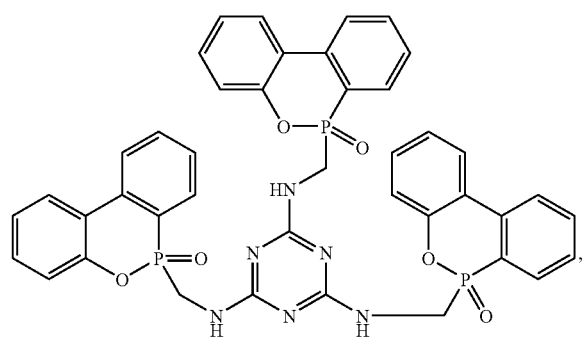

obtainable by condensation of melamine with DOPO and formaldehyde; or

According to an alternative embodiment, suitable derivatives of oxaphosphorinoxide are characterized by the presence of more than three groups of the partial formula (A), according to the structural formulae

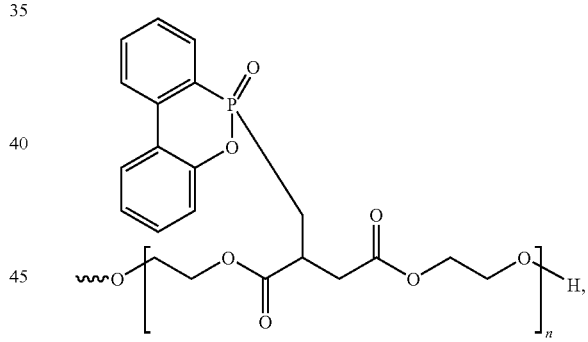

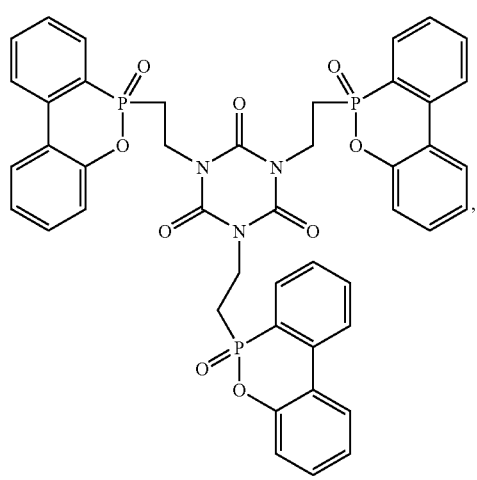

as obtained by intramolecular Michaelis-Arbuzov reaction from

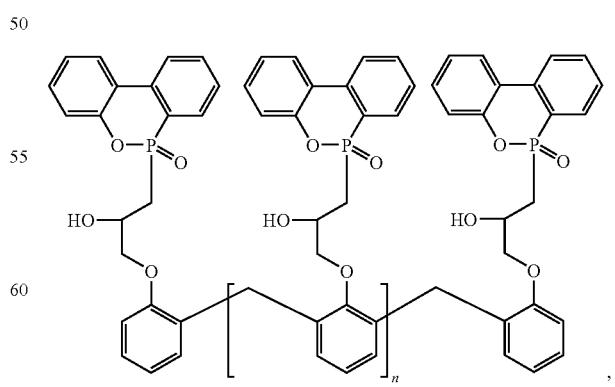

Wherein n represents numerals from 1. to 30, or more preferably from 2 to 10.

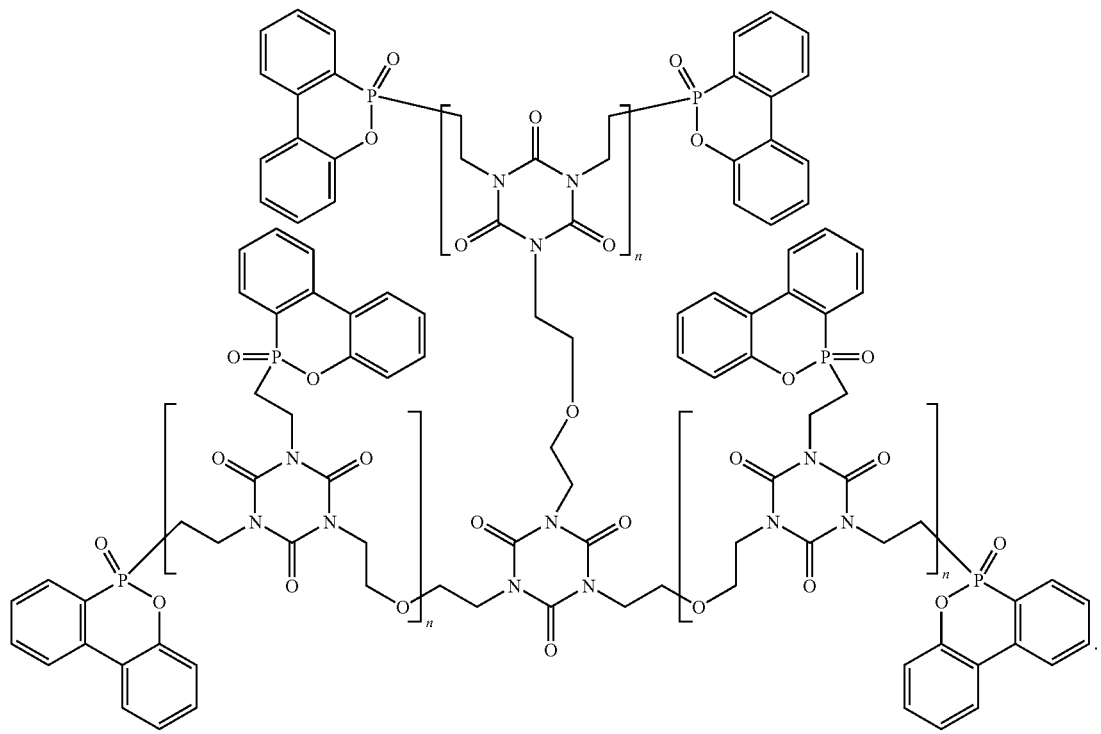

The oxaphosphorinoxides as defined above are known compounds or can be prepared by known methods. Some of them are commercially available.

Component c)

The term polymer substrate comprises within its scope thermoplastic polymers or thermosets.

A list of suitable synthetic polymers is given below:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different and especially by the following methods:
a) Radical polymerisation (normally under high pressure and at elevated temperature).
b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch;

The homopolymers and copolymers mentioned above may have a stereo structure including syndiotactic, isotactic, hemi-isotactic or atactic; where atactic polymers are preferred. Stereo block polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included;

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

b) Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

c) Hydrogenated aromatic polymers derived from hydrogenation of polymers mentioned under 6a). Homopolymers and copolymers may have a stereo structure including syndiotactic, isotactic, hemi-isotactic or atactic; where atactic polymers are preferred. Stereo block polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1. above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes, which contain ethylene oxide as a comonomer; polyacetals modified with thermoplastic polyurethanes, acrylates or MBS.

14. Polyphenylene oxides and sulphides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide imides, polyether imides, polyester imides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polyketones.
20. Polysulphones, polyether sulphones and polyether ketones.
21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
22. Polycarbonates that correspond to the general formula:

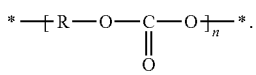

Such Polycarbonates are obtainable by interfacial processes or by melt processes (catalytic transesterification). The polycarbonate may be either branched or linear in structure and may include any functional substituents. Polycarbonate copolymers and polycarbonate blends are also within the scope of the invention. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704; 5,210,268; and 5,606,007. A combination of two or more polycarbonates of different molecular weights may be used.

Preferred are polycarbonates obtainable by reaction of a diphenol, such as bisphenol A, with a carbonate source. Examples of suitable diphenols are:

Bisphenol A:

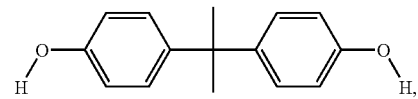

bisphenol AF:

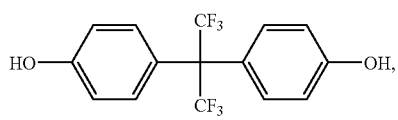

bisphenol AP:

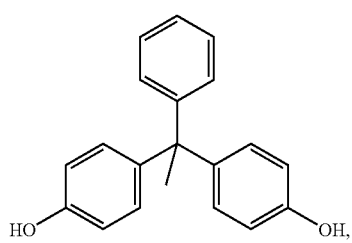

-continued bisphenol B:

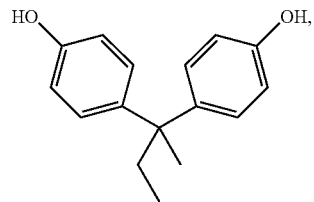

bisphenol C:

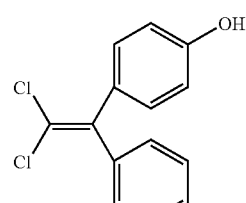

bisphenol E:

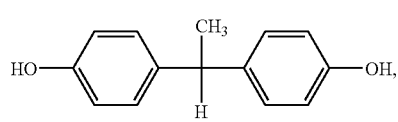

bisphenol F:

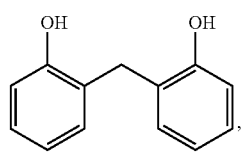

bisphenol M:

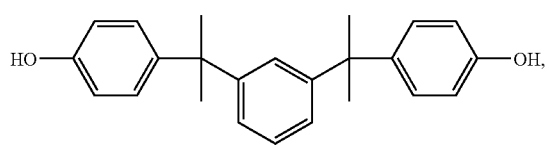

bisphenol P:

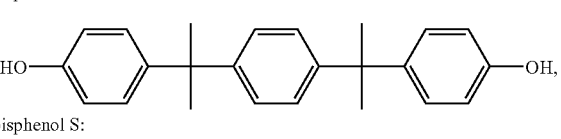

bisphenol S:

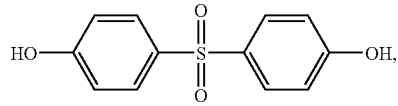

bisphenol TMC:

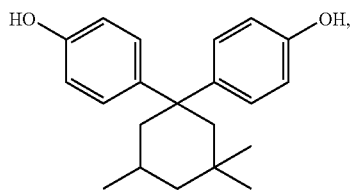

bisphenol Z:

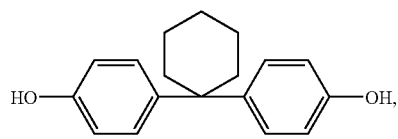

4,4'-(2-norbornylidene)bis(2,6-dichlorophenol); or fluorene-9-bisphenol:

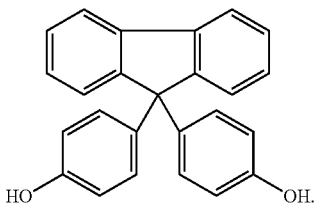

The carbonate source may be a carbonyl halide, a carbonate ester or a haloformate. Suitable carbonate halides are phosgene or carbonylbromide. Suitable carbonate esters are dialkylcarbonates, such as dimethyl- or diethylcarbonate, diphenyl carbonate, phenyl-alkylphenylcarbonate, such as phenyl-tolylcarbonate, dialkylcarbonates, such as dimethyl- or diethylcarbonate, di-(halophenyl)carbonates, such as di-(chlorophenyl)carbonate, di-(bromophenyl)carbonate, di-(trichlorophenyl)carbonate or di-(trichlorophenyl)carbonate, di-(alkylphenyl)carbonates, such as di-tolylcarbonate, naphthylcarbonate, dichloronaphthylcarbonate and others.

The polymer substrate mentioned above, which comprises polycarbonates or polycarbonate blends is a polycarbonate-copolymer, wherein isophthalate/terephthalate-resorcinol segments are present. Such polycarbonates are commercially available, e.g. Lexan® SLX (General Electrics Co. USA). Other polymeric substrates of component b) may additionally contain in the form as admixtures or as copolymers a wide variety of synthetic polymers including polyolefins, polystyrenes, polyesters, polyethers, polyamides, poly(meth)acrylates, thermoplastic polyurethanes, polysulphones, polyacetals and PVC, including suitable compatibilizing agents. For example, the polymer substrate may additionally contain thermoplastic polymers selected from the group of resins consisting of polyolefins, thermoplastic polyurethanes, styrene polymers and copolymers thereof. Specific embodiments include polypropylene (PP), polyethylene (PE), polyamide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butadiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

A preferred embodiment of the invention relates to composition, which comprises
a) At least one salt of phosphinic acid (I),
b) At least one derivative of oxaphosphorinoxide (I), wherein the group of the partial formula

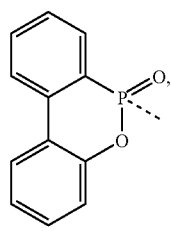

(A)

is present; and c) A polymer substrate.

A particularly preferred embodiment relates to composition, which comprises
a) The aluminium, calcium, magnesium or zinc salt of phosphinic acid (I);
b) 6H-dibenz[c,e][1,2]oxazaphosphorin-6-oxide of the formula:

(IIa)

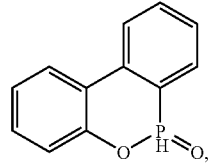

or a derivative thereof; and
c) A polymer substrate.

A highly preferred embodiment of the invention relates to a composition, which comprises
a) The aluminium salt of phosphinic acid (I);
b) At least one derivative of oxaphosphorinoxide (I), wherein the group of the partial formula (A) is present selected from the group consisting of 6H-Dibenz[c,e][1,2]oxazaphosphorin-6-oxide (DOPO), Benzyl-DOPO:

(II,1)

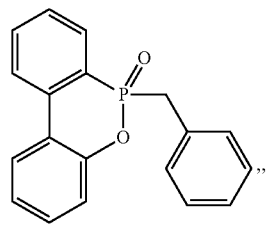

Oligomers of the formula:

(II,2)

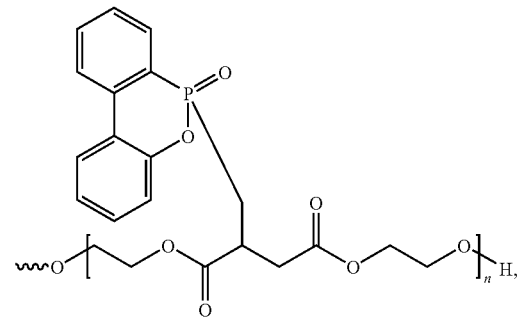

Oligoesters from hydroxyl-functionalized DOPO:

(II,3)

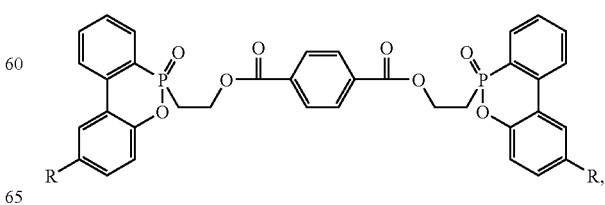

wherein R represents $C_1$-$C_4$alkyl;-

Condensation products of DOPO with 1,3,5-tris(2-hydroxyethyl)-cyanuric acid:

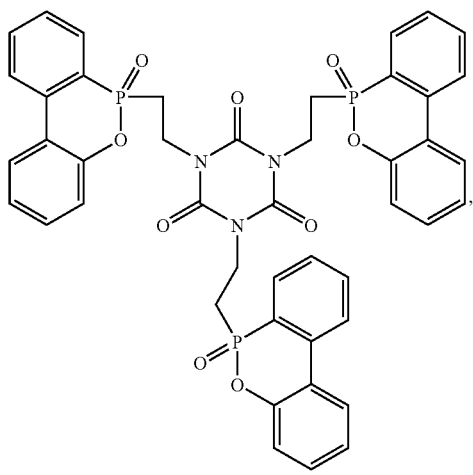
(II,4)

and
and adducts to acrylic esters

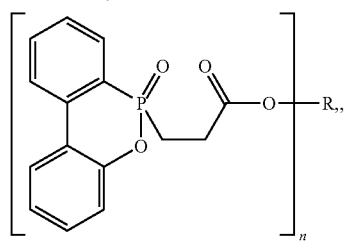
(II,5)

wherein R represents a numeral from two to six and R represents the ester group of a polyhydroxy alcohol, e.g. ethylene glycol, trimethylolpropane, pentaerythitol or dipentaerythritol; and
c) A polymer substrate.

A further embodiment relates to a flame retardant mixture, which comprises
a) At least one salt of phosphinic acid of the formula

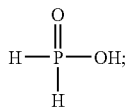
(I)

and
b) At least one derivative of oxaphosphorinoxide as represented by the formula

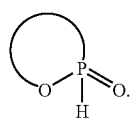
(II)

The mixture of components a) and b) is added to the substrate of component c) in an amount of about 0.1-30.0% by weight, preferably 0.2-20.0% by weight.

The ratio, as expressed in weight amounts, of component a) and b) is in the range of 20:1 to 1:20, preferably 10:1 to 1:10.

A further embodiment relates to process for imparting flame retardancy to a polymer substrate, which process comprises adding to a polymer substrate the mixture as defined above.

Additional Components

The instant invention further pertains to a composition, which comprises, in addition to the components a) b) and c), as defined above, further additives selected from the group consisting of so-called anti-dripping agents, polymer stabilizers and additional flame-retardants, such as phosphorus containing flame-retardants, nitrogen containing flame-retardants, halogenated flame-retardants and inorganic flame-retardants.

According to a preferred embodiment the invention relates composition, which additionally comprises further additives selected from the group consisting of polymer stabilizers and additional flame retardants.

According to another embodiment, the invention relates to a composition which additionally comprises as additional component so-called anti-dripping agents.

These anti-dripping agents reduce the melt flow of the thermoplastic polymer and inhibit the formation of drops at high temperatures. Various references, such as U.S. Pat. No. 4,263,201, describe the addition of anti-dripping agents to flame retardant compositions.

Suitable additives that inhibit the formation of drops at high temperatures include glass fibers, polytetrafluoroethylene (PTFE), high temperature elastomers, carbon fibers, glass spheres and the like.

The addition of polysiloxanes of different structures has been proposed in various references; cf. U.S. Pat. Nos. 6,660,787, 6,727,302 or 6,730,720.

Stabilizers are preferably halogen-free and selected from nitroxyl stabilizers, nitrone stabilizers, amine oxide stabilizers, benzofuranone stabilizers, phosphite and phosphonite stabilizers, quinone methide stabilizers and monoacrylate esters of 2,2'-alkylidenebisphenol stabilizers.

Additional flame-retardants as of present component are known components, items of commerce or can be obtained by known methods.

Representative phosphorus containing flame-retardants, in addition to the ones defined above with regard to component a), are for example:

Tetraphenyl resorcinol diphosphite (FYROLFLEX® RDP, Akzo Nobel), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, ammonium polyphosphate (APP) or (HOSTAFLAM® AP750), resorcinol diphosphate oligomer (RDP), phosphazene flame-retardants and ethylenediamine diphosphate (EDAP).

Nitrogen containing flame-retardants are, for example, isocyanurate flame-retardants, such as polyisocyanurate, esters of isocyanuric acid or isocyanurates. Representative examples are hydroxyalkyl isocyanurates, such as tris-(2-hydroxyethyl)isocyanurate, tris(hydroxymethyl)isocyanurate, tris(3-hydroxy-n-propyl)isocyanurate or triglycidyl isocyanurate.

Nitrogen containing flame-retardants include melamine-based flame-retardants. Representative examples are: melamine cyanurate, melamine borate, melamine phosphates, melamine polyphosphate, melamine pyrophosphate, melamine ammonium polyphosphate and melamine ammonium pyrophosphate.

Further examples are: benzoguanamine, tris(hydroxyethyl)isocyanurate, allantoin, glycoluril, melamine cyanurate, melamine phosphate, dimelamine phosphate, melamine pyrophosphate, urea cyanurate, melamine polyphosphate, melamine borate, ammonium polyphosphate, melamine ammonium polyphosphate or melamine ammonium pyrophosphate, a condensation product of melamine from the series melem, melam, melon and/or a higher condensed compound or a reaction product of melamine with phosphoric acid and/or a reaction product of condensation products of melamine with phosphoric acid or a mixture thereof.

Special emphasis should be given to: dimelamine pyrophosphate, melamine polyphosphate, melem polyphosphate, melam polyphosphate, and/or a mixed polysalt of such a type, more especially melamine polyphosphate.

Representative organohalogen flame-retardants are, for example:

Polybrominated diphenyl oxide (DE-60F, Great Lakes Corp.), decabromodiphenyl oxide (DBDPO; SAYTEX® 102E), tris[3-bromo-2,2-bis(bromomethyl)propyl]phosphate (PB 370®, FMC Corp.), tris(2,3-dibromopropyl)phosphate, tris(2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether) (PE68), brominated epoxy resin, ethylene-bis(tetrabromophthalimide) (SAYTEX® BT-93), bis(hexachlorocyclopentadieno)-cyclooctane (DE-CLORANE PLUS®), chlorinated paraffins, octabromodiphenyl ether, hexachlorocyclopentadiene derivatives, 1,2-bis(tribromophenoxy)ethane (FF680), tetrabromobisphenol A (SAYTEX® RB100), ethylene bis-(dibromo-norbornanedicarboximide) (SAYTEX® BN-451), bis-(hexachlorocycloentadeno) cyclooctane, PTFE, tris-(2,3-dibromopropyl)-isocyanurate, and ethylene-bis-tetrabromophthalimide.

The flame-retardant mentioned above routinely combined with an inorganic oxide synergist. Most common for this use are zinc or antimony oxides, e.g. $Sb_2O_3$ or $Sb_2O_5$. Boron compounds are suitable, too.

The above-mentioned additional flame-retardant classes are advantageously contained in the composition of the invention in an amount from about 0.5% to about 45.0% by weight of the organic polymer substrate; for instance about 1.0% to about 40.0%; for example about 5.0% to about 35.0% by weight of the polymer.

As mentioned above, the composition according to the invention may additionally contain one or more conventional additives, for example selected from pigments, dyes, plasticizers, antioxidants, thixotropic agents, levelling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups. More specific examples are the following components:

1. Antioxidants

Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1-yl)phenol and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

Tocopherols, for example α-, β-, γ-, δ-tocopherol and mixtures thereof (vitamin E).

Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulphide.

Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tertbutyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tertbutyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulphide, isooctyl-3,5-di-tert-butyl-4-hydroxybenzylmercaptoacetate.

Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate.

Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, such as commercially available products like Irganox® 1076.

Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tertbutyl-4-hydroxy-5-methylphenyl)propionyloxy}-1,1-dimethylethyl]-2,4,8,10-tetraoxaspiro[5.5]-undecane.

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Amides of β-(3,5-di-tert-butyl-4-hydroxyphenyl)propionic acid e.g. N,N'-bis(3,5-di-tertbutyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

Ascorbic acid (vitamin C)

2. Light stabilisers 2-(2'-Hydroxyphenyl)benzotriazoles, for example 2-(2'-hydroxy-5'-methylphenyl)benzotriazole, 2-(3',5-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole, such as commercially available light stabilisers from the Tinuvin® series, such as TINUVIN 234, 326, 329, 350, 360 or TINUVIN 1577.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Further phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3",5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl)phosphite (Irgafos® 168, Ciba Specialty Chemicals), tris(nonylphenyl) phosphite,

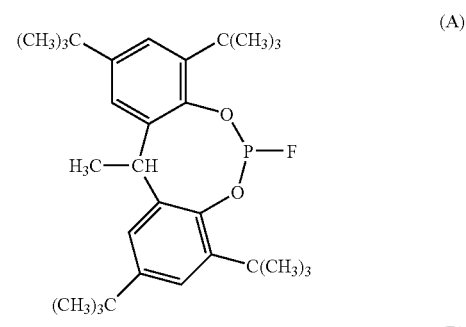

(A)

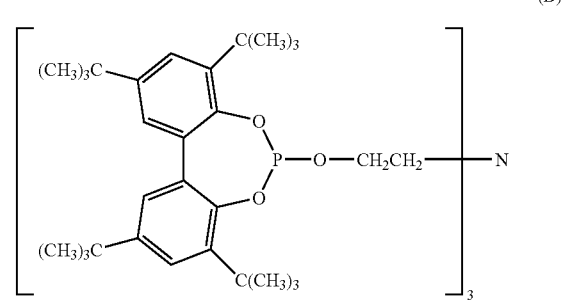

(B)

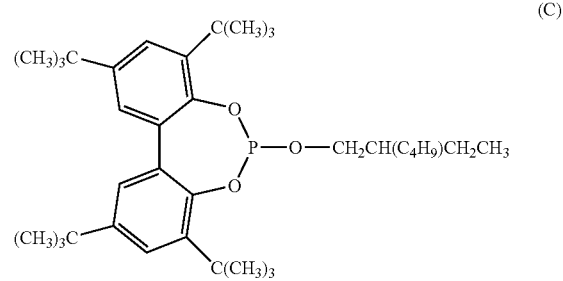

(C)

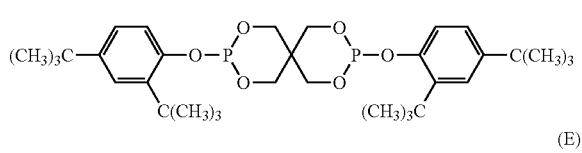

(D)

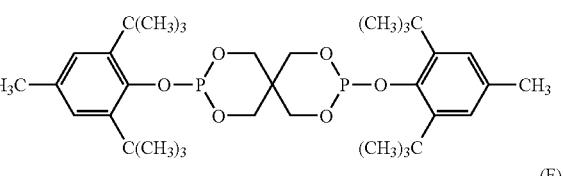

(E)

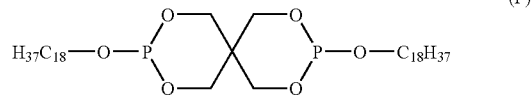

(F)

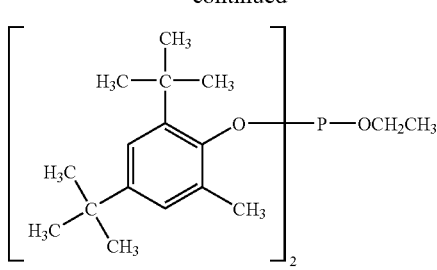
(G)

5. Further nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.
6. Thiosynergists, for example dilauryl thiodipropionate or distearyl thiodipropionate.
7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulphide, pentaerythritol tetrakis(β-dodecylmercapto)propionate.
8. Polyamide stabilisers, for example copper salts in combination with iodides and/or phosphorus compounds and salts of divalent manganese.
9. Basic co-stabilisers, for example melamine, polyvinylpyrrolidone, dicyandiamide, triallyl cyanurate, urea derivatives, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
10. Nucleating agents, for example inorganic substances, such as talcum, metal oxides, such as titanium dioxide or magnesium oxide, phosphates, carbonates or sulphates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
11. Further fillers and reinforcing agents, for example calcium carbonate, silicates, glass fibres, glass bulbs, stainless steel fibres, aramide fibers, asbestos, talc, kaolin, mica, barium sulphate, metal oxides and hydroxides, carbon black, graphite, wood flour and flours or fibers of other natural products, synthetic fibres.
12. Other additives, for example blend compatibilizing agents, plasticisers, lubricants, emulsifiers, pigments, rheology additives, catalysts, flow-control agents, optical brighteners, flame proofing agents, antistatic agents and blowing agents.
13. Additional benzofuranones and indolinones, for example those disclosed in U.S. Pat. Nos. 4,325,863; 4,338,244; 5,175,312; 5,216,052; or 5,252,643; DE-A-4316611; DE-A-4316622; DE-A-4316876; EP-A-0589839 or EP-A-0591102 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tertbutylbenzofuran-2-one, 3-(2,3-dimethylphenyl)-5,7-di-tert-butylbenzofuran-2-one.

Preferred additional additives for the compositions as defined above are processing stabilizers, such as the above-mentioned phosphites and phenolic antioxidants, and light stabilizers, such as benzotriazoles. Preferred specific antioxidants include octadecyl 3-(3,5-di-tert-butyl-4-hydroxyphenyl) propionate (IRGANOX 1076). Specific processing stabilizers include tris-(2,4-di-tert-butylphenyl) phosphite (IRGAFOS 168) and tetrakis(2,4-di-tert-butylphenyl)[1,1-biphenyl]-4,4'-diylbisphosphonite (IRGAFOS P-EPQ). Specific light stabilizers include 2-(2H-benzotriazole-2-yl)-4,6-bis(1-methyl-1-phenylethyl)phenol (TINUVIN 234), 2-(5-chloro(2H)-benzotriazole-2-yl)-4-(methyl)-6-(tert-butyl) phenol (TINUVIN 326), 2-(2H-benzotriazole-2-yl)-4-(1,1,3,3-tetramethylbutyl)phenol (TINUVIN 329), 2-(2H-benzotriazole-2-yl)-4-(tert-butyl)-6-(sec-butyl)phenol (TINUVIN 350), 2,2'-methylenebis(6-(2H-benzotriazol-2-yl)-4-(1,1,3,3-tetramethylbutyl)phenol) (TINUVIN 360), and 2-(4,6-diphenyl-1,3,5-triazin-2-yl)-5-[(hexyl)-oxy]-phenol (TINUVIN 1577).

The additives mentioned above are preferably contained in an amount of 0.01 to 10.0%, especially 0.05 to 5.0%, relative to the weight of the polymer substrate c).

The incorporation of the additive components a) and b) and optional further components into the polymer component c) is carried out by known methods such as dry blending in the form of a powder, or wet mixing in the form of solutions, dispersions or suspensions for example in an inert solvent, water or oil. The additive components a) and b) and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder, or as a solution or dispersion or suspension or melt.

The addition of the additive components to the polymer substrate c) can be carried out in customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W. Knappe, H. Potente, 1989, pp. 3-7, ISBN:3-446-14339-4 (*Vol.* 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be pre-mixed or added individually.

The additive components a) and b) and optional further additives can also be sprayed onto the polymer substrate c). The additive mixture dilutes other additives, for example the conventional additives indicated above, or their melts so that they can be sprayed also together with these additives onto the polymer substrate. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the additives of the invention, optionally together with other additives, by spraying.

The additive components a) and b) and optional further additives can also be added to the polymer in the form of a master batch ("concentrate") which contains the components in a concentration of, for example, about 1.0% to about 40.0% and preferably 2.0% to about 20.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example roto-molded articles, injection molded articles, profiles and the like, and especially a fiber, spun melt non-woven, film or foam.

Thus, present invention further pertains to a molded or extruded article, a fiber, spun melt non-woven or a foam comprising the composition of the invention.

The following examples illustrate the invention, but are not to be construed to limit the scope thereof.

Components Used:

Polybutylene terephthalate (PBT): Crastin® S600 F10, Du Pont de Nemours GmbH, Germany;

Glass fibers: Chop Vantage® 3786 (cut length=4.5 mm, fiber diameter=10 μm), PPG Industries, Inc.;

Exolit® OP 930 (Al-salt of diethylphosphinic acid): Clariant GmbH, Germany;

Al-hypophosphite (Al-phosphinate): commercial product from Anan Drug & Chemicals, India;

Ca-hypophosphite (Ca-phosphinate): Sigma-Aldrich Chemie GmbH, Germany;

Test Compound 1: 10-benzyl-9-oxa-10-phosphaphenanthrene-10-oxide, CAS-No: 113504-81-7. The preparation is described in Beletskaya et al. *Russ. J. Org. Chem.* 2004, 40(12), 1831-35. The use as a flame retardant is described in WO2006/035868;

Test Compound 2: oligocondensation product from

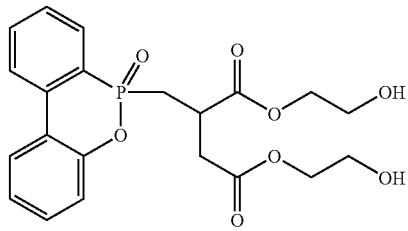

[known as UKANOL-FR50 (Schill & Seilacher) or M-Ester (Sanko)] having a melting range of 71-79° C., CAS-No: 68816-19-3. The preparation is described in the German Published Patent Application No. 2 646 218 and JP 2000336132;

Test Compound 3: 9,10-Dihydro-9-oxa-10-phosphaphenanthrene-10-oxide (DOPO): Sigma-Aldrich Chemie GmbH, Germany;

Test Compound 4: 6-Aminouracil (4-Amino-2,6-dihydroxypyrimidine): Sigma-Aldrich Chemie GmbH, Germany.

Test Methods to Assess Flame Retardancy:

UL 94 test for "*Flammability of Plastic Materials for Parts in Devices and Appliances*", 5th edition, Oct. 29, 1996. Ratings according to the UL 94 V test are compiled in the following table (time periods are indicated for one specimen):

| Rating | After flame time | Burning drips | Burn to clamp |
|--------|------------------|---------------|---------------|
| V-0    | <10 s            | No            | No            |
| V-1    | <30 s            | No            | No            |
| V-2    | <30 s            | Yes           | No            |
| nc     | <30 s            |               | Yes           |
| nc     | >30 s            |               | No            | nc: no classification

Unless stated otherwise, the flame retardant additives listed in Table 1 are dry-mixed and dried in vacuo for at least 12 hours at 90° C. The mixtures obtained are melt-compounded in a co-rotating Werner & Pfleiderer WLE 25 twin screw extruder with two lateral feeders and exhaust unit.

Processing programme PBT: Zones 1-11=60°, 225°, 265°, 260°→260°, 255° C., vacuum<50 mbar, speed of rotation=150 rpm, throughput=8 kg/h.

The flame retardant components are incorporated into the polymer melt via lateral feed unit, the glass fibers are added via a second lateral feed unit. The homogenized polymer strand was drawn off, cooled in a water bath and then pelletized.

After adequate drying of the pellets (in-vacuo, 12 hours at 90° C.) the formulations are processed further at melt temperatures of 240°-275° C. in an injection molding machine (Arburg 370S Allrounder) to give test specimens (UL test bar, 1.6 mm thickness). After conditioning for 24 hours at 25° C. and 50% relative humidity the test specimens are tested and classified on the basis of the UL 94-V (Underwriter Laboratories) test.

Unless stated otherwise, all experiments of each series are carried out under identical conditions for comparative purposes (e.g. temperature profiles, screw geometries, addition of flame retardant additives, injection-molding parameters, etc.). All amounts are stated in percent by weight and based on the plastics molding composition, including the flame retardant(s) and reinforcing additives.

Intrinsic viscosities are determined according to DIN EN ISO 1628-1 in a capillary viscometer [1.0% by weight in phenol:dichlorobenzene (1:1)]. Comparative tracking index (CTI) is determined according to DIN EN 60112 by using a measuring device PG-132 from AENEA, Germany.

Hydrolysis resistance (so called "leaching") is determined by storing UL bars in deionized water (168 h, 70° C.). After removing the samples from water and drying at ambient temperature, the flame retardant (FR) properties are again tested according to UL 94-V. Compounds with "nc" rating are not expected to improve FR properties during water storage. Therefore, no leaching test is made.

TABLE 1

Glass fiber reinforced PBT formulations (Crastin ® S600 F10 + 30% glass fiber)

| Example | FR-Components | Intrinsic viscosity | UL 94 rating, 1.6 mm (after leaching) | CTI [V] | Total burning time [s] (after leaching) |
|---|---|---|---|---|---|
| I* | w/o | 0.96 | nc | 400 | 640 |
| II* | 20.0% EXOLIT OP 930 | 0.79 | V-0 (V-0) | 550 | 21 (38) |
| III* | 15.0% EXOLIT OP 930 | 0.80 | nc | 550 | 110 |
| IV* | 12.5% EXOLIT OP 930 + 2.5% Compound 1 | 0.82 | nc | 500 | 98 |
| V* | 17.5% Al-hypophosphite | 0.85 | V-1 (V-1) | 600 | 34 (39) |
| VI* | 12.5% Ca-hypophosphite + 5% Compound 1 | 0.94 | nc | 600 | 290 |
| VII* | 15% Al-hypophosphite | 0.94 | nc | 600 | 150 |
| VIII* | 15% Compound 1 | 1.02 | nc | 550 | 310 |
| 1** | 12.5% Al-hypophosphite + 2.5% Compound 3 | 0.88 | V-0 (nc) | 550 | 23 (77) |
| 2** | 12.5% Al-hypophosphite + 7.5% Compound 1 | 0.90 | V-0 (V-0) | 550 | 8 (16) |
| 3** | 12.5% Al-hypophosphite + 5% Compound 1 | 0.92 | V-0 (V-0) | 575 | 10 (35) |
| 4** | 12.5% Al-hypophosphite + 2.5% Compound 1 | 0.95 | nc | 600 | 145 |
| 5** | 13.0% Al-hypophosphite + 4.0% Compound 1 | 0.93 | V-0 (V-0) | 600 | 13 (11) |
| 6** | 12.5% Al-hypophosphite + 7.5% Compound 2 | 0.97 | V-0 (V-0) | 575 | 12 (25) |
| 7** | 12.5% Al-hypophosphite + 5.0% Compound 2 | 0.84 | V-0 (V-0) | 600 | 7 (8) |
| 8** | 12.5% Al-hypophosphite + 2.5% Compound 2 | 0.91 | nc | 600 | 177 |
| 9** | 10.0% Al-hypophosphite + 7.5% Compound 2 | 0.97 | V-0 (V-1) | 550 | 19 (50) |

*Referential Example: Comparison
**Inventive Example
nc: no classification

It is evident from the results of above that the compositions according to the present invention provide polymers with flame retardant and self-extinguishing properties.

Further benefits of the compositions of the present invention are improved electrical properties (CTI values) and resistance towards hydrolysis (leaching test: water, 70° C., 168 hours).

TABLE 2

Glass fiber reinforced PBT formulations (Crastin ® S600 F10 + 30% glass fiber)

| Example | FR-Components | UL 94 rating, 1.6 mm | Total burning time [s] |
|---|---|---|---|
| 10** | 14.0% Al-hypophosphite + 2.0% Compound 4 + 1.0% Compound 1 | V-0 | 20 |
| 11** | 14.0% Al-hypophosphite + 2.0% Compound 4 + 2.0% Compound 1 | V-0 | 14 |
| 12** | 14.0% Al-hypophosphite + 2.0% Compound 4 + 3.0% Compound 1 | V-0 | 10 |
| 13** | 14.0% Al-hypophosphite + 2.0% Compound 4 + 4.0% Compound 1 | V-0 | 10 |

**Inventive Example
nc: no classification

It is evident from the results of above that the compositions according to the present invention provide polymers with flame retardant and self-extinguishing properties.

The invention claimed is:
1. A composition which comprises
a) The aluminium salt of phosphinic acid (I);

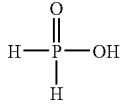

b) At least one compound selected from the group consisting of
6H-Dibenz[c,e][1,2]oxazaphosphorin-6-oxide (DOPO), Benzyl-DOPO (II, 1),

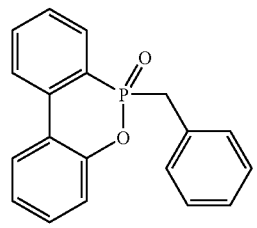

and
Oligomers of the formula (II,2)

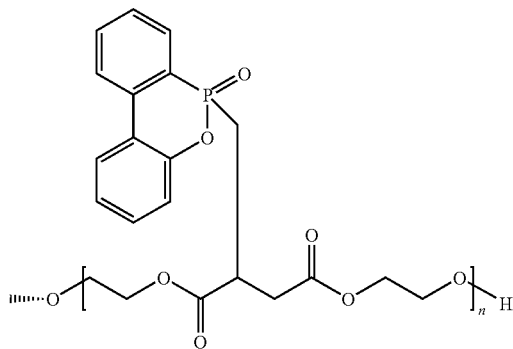

wherein n represents a numeral from two to six
and
c) A polymer substrate.

2. A composition according to claim 1, which additionally comprises further additives selected from the group consisting of polymer stabilizers and additional flame retardants.

3. A flame retardant mixture which comprises
a) The aluminum salt of phosphinic acid (I)

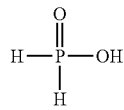

and
b) At least one compound selected from the group consisting of 6H-dibenz[c,e][1,2]oxazaphosphorin-6-oxide (DOPO), Benzyl-DOPO (II,1)

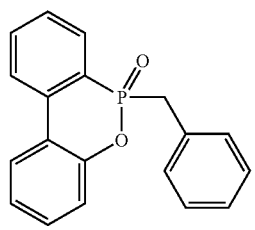

and
Oligomers of the formula (II,2),

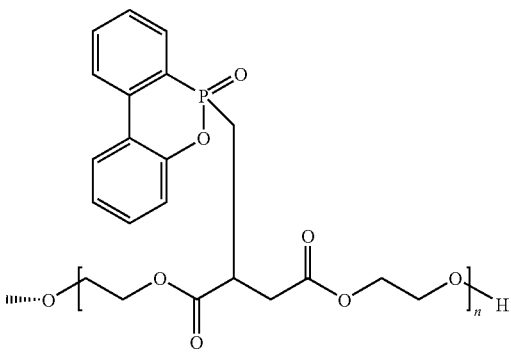

wherein n represents a numeral from two to six.

4. A process for imparting flame retardancy to a polymer substrate, which process comprises adding to a polymer substrate the mixture according to claim 3.

* * * * *